Sept. 26, 1967     K. P. SCHEUERMANN     3,343,625
IGNITION SYSTEM FOR PREVENTING UNAUTHORIZED USE OF VEHICLES
Filed Nov. 2, 1965     2 Sheets-Sheet 1

INVENTOR
KURT PHILIPP SCHEUERMANN
BY
*Seidel & Gonda*
ATTORNEYS.

United States Patent Office 3,343,625
Patented Sept. 26, 1967

3,343,625
IGNITION SYSTEM FOR PREVENTING
UNAUTHORIZED USE OF VEHICLES
Kurt Philipp Scheuermann, 211 Eastbourne Terrace,
Moorestown, N.J. 08057
Filed Nov. 2, 1965, Ser. No. 506,083
9 Claims. (Cl. 180—114)

This invention relates to a novel system for preventing the theft of vehicles, and more particularly to a system installed in a vehicle which will prevent unauthorized operation of the vehicle.

Heretofore, various devices have been derived to prevent the theft of vehicles. Many of the devices have been directed to alarm systems wherein an alarm is actuated upon an attempt to short circuit the power supply with the circuit of the engine by bypassing the ignition switch. While in some instances such devices may frighten the thief away, they do not always prevent the theft of the vehicle. Other systems utilize a hidden switch or other coded system known only to the owner of the vehicle. Such systems are also inadequate since they must be operated even when the vehicle is being used by one authorized to use it. Such systems create further problems when the vehicle is operated by another with the owners consent, such as a parking lot attendant, because if the system is not disclosed the vehicle will not operate. Furthermore, prior systems have had the disadvantages of being complex, cumbersome, and unreliable in operation.

A system in accordance with the present invention comprises the use of three wires, one of which is fixedly attached to the ignition lock at one end and all of which are fixedly attached to a housing at their other end. The three wires are enclosed in a cable. The cable may be composed of steel or other suitable material which prevents tampering with the wires without the severance thereof. The steel housing is mounted alongside the distributor and locks the cap of the distributor in its operative position. The steel housing is provided with a conventional lock which prevents tampering with the contents therein.

Inside the steel housing is an electrical circuit which prevents operation of the distributor when the wires of the ignition circuit are tampered with. Further provisions are made for entirely bypassing the system inside the housing but such provisions cannot be put into operation until a mechanism inside the steel housing is manually moved. Thus, since the housing is securely locked, all unauthorized use of the vehicle is prevented.

Furthermore, the steel housing is adapted to lock the distributor cap on the distributor housing and therefore prevent removal of said distributor cap without the destruction thereof.

It is an object of the present invention to provide a novel system for preventing theft of a vehicle.

It is another object of the present invention to provide a system which is more efficient, rapid and dependable for preventing unauthorized use of a vehicle.

Another object of this invention is to provide a system which is easy to install in any vehicle.

Another object of this invention is to provide a system which will not require any disruption in normal driving routine nor in any way interfere with normal operation of the vehicle.

Another object of this invention is to provide a system which will automatically prevent electricity from being transmitted to the distributor upon tampering with the vehicle and, furthermore, maintain said vehicle in an inoperative condition until manually adjusted by an authorized person.

Other objects will appear hereinafter.

For the purpose of illustrating the invention, it is shown in the drawings a form which is presently preferred; it being understood, however, that this invention is not limited to the precise arrangement in instrumentalities shown.

Referring to the drawings in detail, wherein like numerals indicate like elements, there is shown in FIGURES 1–3 a housing designated generally as 10.

Figure 1:
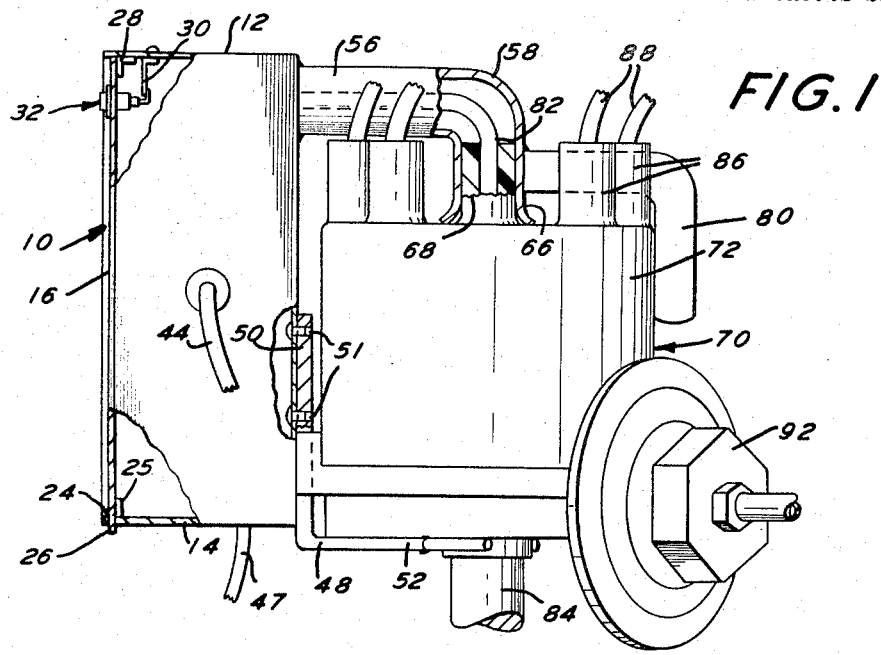
FIGURE 1 is a perspective view partially in section of the apparatus of this invention.
Figure 2:
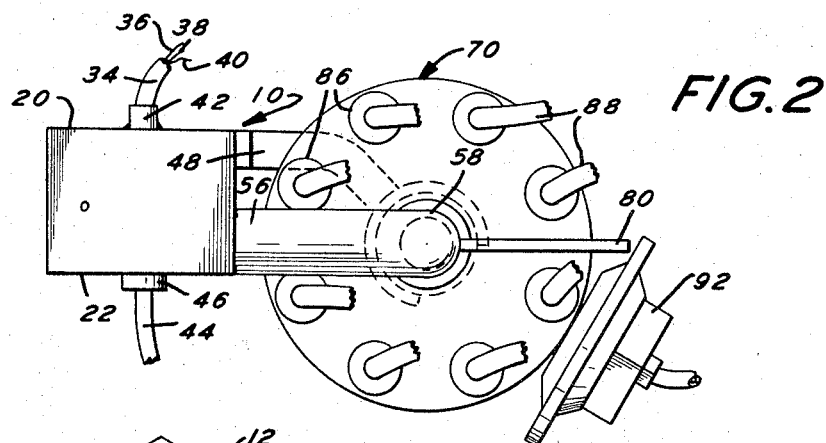
FIGURE 2 is a plan view of the apparatus of this invention.
Figure 3:
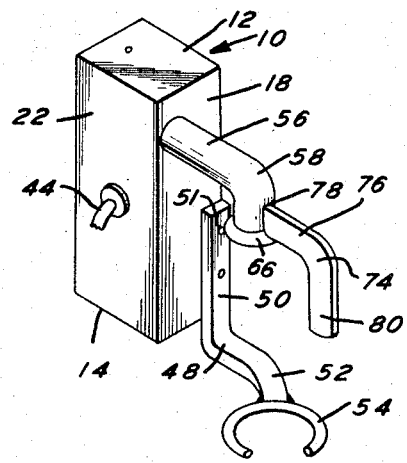
FIGURE 3 is a perspective view of the steel housing of this invention.

The housing 10 includes a generally rectangular shape and may be made from a material which is strong and durable, such as steel. The housing includes a top wall 12, a bottom wall 14, a front wall 16, a back wall 18 and side walls 20 and 22. The front wall 16 of the housing 10 is removable and serves as a means of obtaining entry into the housing 10. The bottom wall 14 is provided with a slot 24 punched therein. The slot 24 is provided an upstanding flange 25 against which the front wall 16 is adapted to abut. The front wall 16 is provided with an integrally formed extension 26 which is adapted to be received by slot 24 when the front wall 16 abuts the flange 25. A flange 28 is welded to the top wall 12. The front wall 16 is adapted to be received between the top wall 12 and the bottom wall 14 and abut the flanges 25 and 28. Also welded to the top wall 12 is an L-shaped member 30 which is adapted to cooperate with a conventional lock 32 which is securely connected to the front wall 16. It can readily be seen that when the housing 10 is locked, the front wall 16 is recessed between the walls 12 and 14 and the side walls 20 and 22 of the housing, thus preventing unauthorized entry into the housing.

A cable 34 enters the housing 10 through an opening in the side wall 20. The cable 34 contains three wires 36 and 38 and 40. At its other end, the cable 34 is connected to the ignition lock. Only the wire 38 is soldered or otherwise fixedly connected to the ignition lock. The wire 38 is fully insulated. Wires 36 and 40 are insulated from each other and wire 38. The wires 36 and 40 extend along with wire 38 to the ignition lock but they do not come into contcat with it. They are taped at their ends and therefore, under normal operating conditions no current flows through the wires 36 and 40. The cable 34 is preferably made of steel or other strong material, so that the only way to tamper with the wires 36, 38 and 40 therein is to cut the cable 34 thereby crossing the wires therein. The cable 34 is preferably crimped at its connection with the ignition lock and may be welded or crimped at its connection 42 with the side wall 20 of the casing 10.

The connection of the wires 36, 38 and 40 inside the housing 10 will be discussed hereinafter.

The side wall 22 of the housing 10 is adapted to receive a cable 44. The cable 44 carries a voltage from the secondary winding of a conventional transformer 120 into the housing 10. A resilient grommet 46 is provided at the opening in side wall 22 at the point of entry of the cable 44 into the housing 10. A wire 47 extends downwardly from the bottom wall 14 of the housing 10. The wire 47 is attached to the primary winding of the transformer 120.

The housing 10 has a support arm 48 connected thereto. The support arm comprises a downwardly extending portion 50 and an outwardly projecting portion 52. The housing 10 is connected to the downwardly extending portion 50 by means of conventional screws 51. The connection is made through the back wall 18 of the housing 10. Thus, it is readily seen that the support arm 48 cannot be disconnected from the casing 10 without first gaining entry into the housing which, under normal circumstances will be locked by means of lock 32.

The outwardly projecting portion 52 of the support arm 48 has a U-shaped retaining member 54 integral therewith. The U-shaped member 54 is adapted to grip a further support member 84 and thus provide for stability of the housing 10. The elements 48, 50, 52, and 54 may be made of hardened steel or other suitable material.

A substantially tamper proof hardened channel 56 is connected to the housing 10 at its back wall 18. The channel 56 may be welded or otherwise securely connected to the back wall of the housing 10. A downwardly extending portion 58 is integrally connected to the other end of the channel 56. The downwardly extension portion 58 may be provided at its lowermost end with an enlarged opening 66 which is adapted to receive the uppermost end 68 of the distributor cap 72 of the distributor 70. Also connected to the portion 58 is a distributor cap retaining L-shaped member 74. The L-shaped member 74 has an outwardly projecting portion 76 which may be welded at 78, integrally formed with the portion 58, or connected in any other convenient manner to the portion 58. The L-shaped member 74 has a downwardly projecting portion 80 which engages the distributor cap 72. Thus, it can readily be seen that the L-shaped member 74 and the portion 58 together with the channel 56 prevent removal of the distributor cap and thereby prevent tampering with the distributor. The wire 44 which carries the voltage from the secondary winding 124 of the transformer 120 is received in the channel 56 and the portion 58 and thereafter is connected to the distributor 70.

The distributor 70 is mounted on a support 84. The U-shaped retaining member 54 of the support arm 48 is also adapted to engage the support 84. The distributor 70 has a series of sleeves at 86 at its uppermost end. The number of sleeves will depend upon the number of cylinders of the vehicle to which this invention is connected. These sleeves 86 are adapted to receive wires 88 which thereafter are connected to a series of spark plugs 90. Also shown attached to the distributor 70 is a vacuum advance diaphragm 92 which is conventional and forms no part of this invention.

Figure 4:
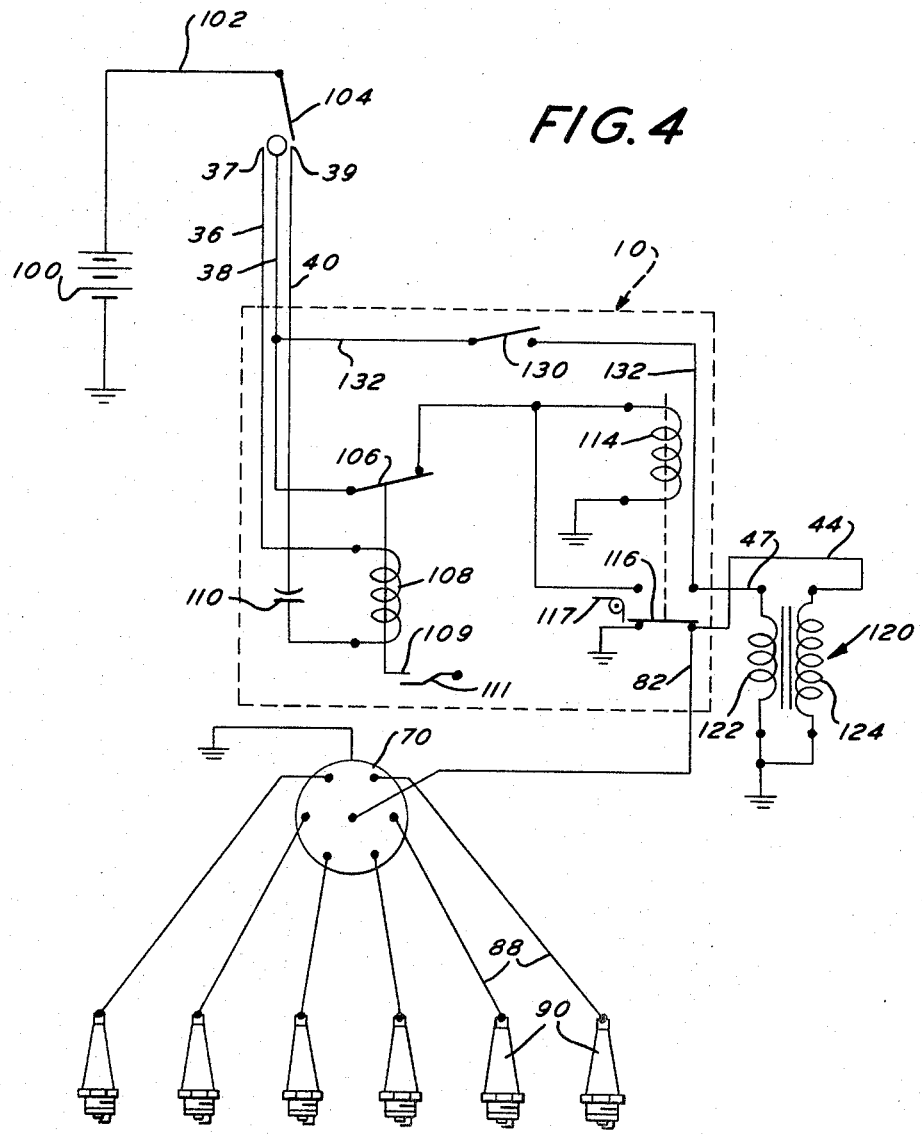
FIGURE 4 shows the circuit of this invention.

Referring now particularly to FIGURE 4, wherein there is shown a battery 100 connected by a lead 102 to the ignition switch 104. The ignition switch 104 is in a normally open position and is adapted to be closed solely by means of a key. Wire 38 is directly connected to the ignition switch. The walls of the housing 10 are indicated by a series of dash lines in FIGURE 4.

The wire 38 is connected to a normally closed relay 106. The relay 106 is adapted to be opened when the coil 108 is energized. Connected to the lowermost end of the relay 106 is an outwardly projecting latch 109. Spaced below the projection 109 is an automatic lock 111. The automatic lock 111 may be made of spring steel. The latch 109 is adapted to travel downwardly beyond the end of the lock 111 upon the opening of relay 106. After the latch has moved to a position beneath lock 111, the latch 109 is prevented from moving upwardly to close the relay 106 because of its engagement with lock 111. Thus, in order to once again close relay 106 it is necessary to open the housing 10 and mechanically move the automatic lock 111 out of the path of the latch 109.

Wire 40 is connected to the positive end of a charged capacitor 110. Wire 36 is connected through the winding 108 to the negative end of the charged capacitor 110. If the wires 36 and 40 were brought into contact, capacitor 110 would discharge thereby energizing the winding 108 and thus the normally closed relay 106 would be opened. This would only happen if the cable 34 were severed.

The current from wire 38 will normally flow through a relay 106 to the coil 114. The coil 114 upon energization is adapted to close a normally open relay 116. Upon energization of the coil 114, the switch 116 will be closed and the current will be allowed to flow through the wire 47 into the primary winding 122 of the transformer 120.

The transformer 120 is conventional and has a secondary winding 124 associated therewith. By means of the normal operation of the cam and breaker points (not shown) a high voltage is induced a secondary winding 124. This high voltage flows through cable 44 into the casing 10. Thereafter, the high voltage is transmitted through the wire 82 into the distributor 70, and the spark plugs 90 are fired in the conventional manner.

Since the relay 116 is normally open, the secondary winding 124 of the transformer 120 is normally connected to ground. Thus, bypassing the system in the housing 10 will not enable an unauthorized person to operate the vehicle. Unless relay 116 is closed, which can only be accomplished by an authorized person, the transformer 120 will always be connected to ground thereby eliminating any possibility of theft of the vehicle.

Provision is made for an authorized person to bypass the system in housing 10. It may be desirable to bypass the system in the housing 10 due to a weak battery or for other similar reasons. A manual lock 117 is provided inside the housing 10.

The manual lock 117 is adapted to cooperate with the normally open relay 116. The relay 116 may be manually closed and held in the closed position by moving the lock 117 into locking position. The manual lock 117 is utilized in connection with a bypass switch 130 in a line 132 which is connected to wire 38. When it is desired to bypass the system in the housing 10 relay 116 is closed and locked in its closed position by means of the manual lock 117. Thereafter, the bypass switch 130 can be closed and the current will flow through line 132 into the primary winding 122, the secondary winding 124, the distributor 70, lines 88 and the spark plugs 90.

The manner in which the system of the present invention is utilized will now be set forth.

If use of the vehicle is authorized the ignition switch 104 will be closed in the conventional manner. Thereafter, current will flow through wire 38 which is housed in the cable 34. The cable 34 is composed of steel or other such material and is crimped at its connection to the ignition lock 104. The cable 34 at its other end enters the housing 10 and is fixedly attached thereto by a weld 42 or other similar means. The current will travel through normally closed relay switch 106 and thereafter energize coil 114 to close the normally open relay 116. Thereafter, the wire 47 carries the current out of housing 10 into the primary coil 122 of the transformer 120. The transformer 120 is conventional. The secondary winding 124 has a high voltage induced therein. The high voltage travels through cable 44 back into the housing 10. The relay 116, being closed due to energization of coil 114, permits the high voltage to be transmitted through wire 82 to the distributor 70. The distributor thereafter functions in a conventional manner and transmits the high voltage sequentially through the wires 88 to the spark plugs 90.

If it is desired to bypass the system in the housing 10, it is first necessary to obtain entry into the housing. The relay 116 is manually closed and held in a closed position by moving a manual lock 117 into its operative position. Thereafter, the bypass switch 130 may be manually closed. Thus, the current will flow through the wire 38 into the wire 132 through the closed switch 130 and into the primary winding 122 of the transformer 120. Once again, the transformer operates in a conventional manner and due to the relay 116 being held closed by the mechanical lock 117 the distributor receives the high voltage from the secondary winding 124 of the transformer 120.

The manner in which the system of the present invention prevents unauthorized use of a vehicle will be set forth.

The housing 10 is securely locked closed by means of a conventional lock 32. The wires 36, 38 and 40 are substantially protected from tampering because they are enclosed in steel cable 34. If the steel cable 34 is cut, the wires 36 and 40 will be crossed and the capacitor 110 will be discharged thus energizing the coil 108. Energization of the coil 108 will cause the relay 106 to be opened. If the relay 106 is open it is readily observed that the coil 114 cannot be energized and therefore the relay 116 will remain open. As long as the relay 116 is open, the secondary winding of the transformer will be connected to ground. Therefore, the distributor 70 will not receive any voltage and the vehicle will be prevented from operation.

If an attempt is made to bypass the cable 34 and cross the wire 102 leading from the battery 100 with the wire 47 leading to the primary coil, this attempt will also fail. It is readily observed that as long as the switch 116 remains open the cable 44 carrying high voltage from the secondary winding 124 of the transformer 120 will always be connected to ground.

The wire 82 carries a high voltage from the secondary winding 124 of the transformer 120 through the channel 56 and the portion 58 into the distributor 70. Thus, it is obviously extremely difficult to tamper with the wire 82. Furthermore, the distributor cap 72 is securely held in place by means of the support arm 48 which is fixedly attached to the portion 58. It is readily seen that unauthorized removal of the distributor cap 72 is prevented.

It is readily apparent that this invention provides a system which will always function to prevent the unauthorized use of a vehicle.

The present invention may be embodied in other specific forms without departing from the spirit or essential attributes thereof and accordingly, reference should be made to the appended claims rather than to the foregoing specification as indicating the scope of the invention.

I claim:

1. A system for the prevention of unauthorized use of a vehicle comprising a housing, a normally closed relay within said housing, a normally open relay within said housing, a transformer to transmit voltage to a distributor, said transformer being connected to ground when said normally open relay is open, said transformer being electrically coupled to said distributor when said normally open relay is closed, said normally open relay adapted to be closed by current flowing through said normally closed relay, and means responsive to tampering with the system to open said normally closed relay and thereby prevent closing of said normally open relay to cause transmission of voltage from said transformer to ground and thereby prevent unauthorized use of the vehicle.

2. A system as set forth in claim 1 wherein said means responsive to tampering with said system includes a plurality of wires within a cable and one of said plurality of wires coupled to an ignition switch, said wires when severed being adapted to energize a coil to open said normally closed relay.

3. A system as set forth in claim 1 including a lock connected to said housing for prevention of unauthorized entry therein and said housing having means connected therewith for prevention of removal of the cap of said distributor.

4. A system as set forth in claim 1 including an automatic lock means within said housing, said automatic lock means preventing closing of said normally closed relay after said normally closed relay has been opened, and said automatic lock being manually movable to allow said normally closed relay to be closed after said normally closed relay has been opened.

5. A system as set forth in claim 1 including a manual lock within said housing, said manual lock being movable to close said normally open relay to permit said normally open relay to be bypassed.

6. A theft prevention system for a vehicle including an ignition switch, a cable having a plurality of wires therein, said cable being composed of a material which renders said cable substantially tamperproof, said cable at its one end being securely connected to said ignition switch, a housing composed of a material which renders said housing substantially tamperproof, a lock, said lock being adapted to lock said housing to prevent unauthorized entry therein, said cable at its other end adapted to be securely connected to said housing, a normally closed relay within said housing, a normally open relay within said housing, current flowing through said normally closed relay adapted to close said normally open relay, a transformer, a distributor, said transformer being electrically connected to said distributor when said normally open relay is closed, said transformer being electrically isolated from said distributor when said normally open relay is open, thereby preventing operation of said distributor, said normally closed relay adapted to be open when said cable is severed, thereby preventing closure of said normally open relay thus preventing operation of said distributor and preventing theft of the vehicle.

7. A housing, said housing being composed of a material which renders said housing substantially tamperproof, said housing adapted to have means associated therewith for preventing unauthorized entry into said housing, a normally closed relay within said housing, a normally open relay within said housing, a charged capacitor within said housing, said normally closed relay being opened upon a flow of current through said charged capacitor, said normally open relay adapted to be closed when current flows through said normally closed relay, said normally open relay remaining open when said normally closed relay is open, and means for connecting the housing to a distributor of an internal combustion engine to prevent unauthorized removal of the distributor.

8. A housing as set forth in claim 7 including an automatic lock within said housing, said automatic lock preventing closing of said normally closed relay after said normally closed relay has been opened, and said automatic lock being manually movable to allow said normally closed relay to be closed after said normally closed relay has been opened.

9. A housing as set forth in claim 7 including a manual lock within said housing, said manual lock being movable to close the normally open relay to permit said normally open relay to be bypassed.

References Cited

UNITED STATES PATENTS

| | | | |
|---|---|---|---|
| 2,289,296 | 7/1942 | Provan | 123—146.5 |
| 2,535,366 | 12/1950 | Mead. | |
| 2,861,644 | 11/1958 | Martin | 180—82 |
| 3,010,531 | 11/1961 | Flora | 180—82 |
| 3,160,761 | 12/1964 | Fuller | 307—10 |
| 3,174,502 | 3/1965 | Howarth | 307—10 X |

KENNETH H. BETTS, *Primary Examiner.*